US008989994B2

(12) United States Patent
Love et al.

(10) Patent No.: US 8,989,994 B2
(45) Date of Patent: Mar. 24, 2015

(54) SYSTEM AND METHOD FOR FAULT DIAGNOSIS IN FUEL INJECTION SYSTEM

(75) Inventors: William J. Love, Dunlap, IL (US); Frank Lombardi, Metamora, IL (US); Daniel R. Puckett, Peoria, IL (US); Kiran S. Prakash, Dunlap, IL (US); Aaron L. Thomas, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 455 days.

(21) Appl. No.: 13/542,810

(22) Filed: Jul. 6, 2012

(65) Prior Publication Data

US 2014/0012484 A1 Jan. 9, 2014

(51) Int. Cl.

*G06F 19/00* (2011.01)
*F02D 41/22* (2006.01)
*F02D 41/20* (2006.01)

(52) U.S. Cl.

CPC .............. *F02D 41/221* (2013.01); *F02D 41/20* (2013.01); *F02D 2041/2058* (2013.01); *F02D 2041/2093* (2013.01); *F02D 2041/224* (2013.01)
USPC .......................... 701/114; 123/478; 73/114.45

(58) Field of Classification Search

CPC .. F02D 41/222; F02D 41/34; F02D 2041/224
USPC .......... 701/103, 105, 114, 115; 123/434, 445, 123/478–480; 73/114.38, 114.45
See application file for complete search history.

(56) References Cited

U.S. PATENT DOCUMENTS

| | | | | |
|---|---|---|---|---|
| 4,989,150 | A * | 1/1991 | Tazawa | 701/101 |
| 6,778,371 | B2 | 8/2004 | Koida | |
| 7,176,693 | B2 | 2/2007 | Tsuchiya | |
| 2002/0080544 | A1 | 6/2002 | Pelligrino | |
| 2004/0084025 | A1* | 5/2004 | Zhu et al. | 123/435 |
| 2008/0212246 | A1 | 9/2008 | Tanaka | |
| 2008/0319699 | A1* | 12/2008 | Perryman | 702/115 |
| 2009/0184576 | A1* | 7/2009 | Oura et al. | 307/9.1 |
| 2009/0314073 | A1* | 12/2009 | Perryman et al. | 73/114.45 |
| 2010/0011748 | A1 | 1/2010 | Yokota | |
| 2010/0199752 | A1* | 8/2010 | Lucido et al. | 73/114.45 |
| 2011/0088461 | A1* | 4/2011 | Howarth et al. | 73/114.45 |

FOREIGN PATENT DOCUMENTS

| | | | |
|---|---|---|---|
| DE | 3202319 | A1 | 7/1983 |
| EP | 2312178 | A2 | 4/2011 |

* cited by examiner

*Primary Examiner* — John Kwon

(57) ABSTRACT

A method for fault diagnosis in a fuel injection system having first and second fuel injectors. The method includes initiating a current flow in the first and second fuel injectors. Further, a rise duration of the current flow to reach a threshold level is measured. The method further includes comparing the rise duration and a preset duration. The fuel injection system is controlled based on the comparison.

20 Claims, 3 Drawing Sheets

SYSTEM AND METHOD FOR FAULT DIAGNOSIS IN FUEL INJECTION SYSTEM

TECHNICAL FIELD

The present disclosure relates to a fuel injection system and more particularly to a control system and a method for fault diagnosis in the fuel injection system.

BACKGROUND

Internal combustion engines use fuel injectors to deliver fuel under pressure to one or more cylinders. Such fuel injectors utilize actuators which are operated by an engine control to deliver measured quantities of fuel to the cylinders, in synchronism with movement of pistons within the cylinders. The timing of fuel injection and the quantity of fuel injected during each injection operation affect the efficiency of the engine and the emissions therefrom. Further, it is required to sequence the injection of the fuel by each fuel injector for sustainable operation of the engine.

During operation of the engine, there may be a fault due to short-circuiting of the fuel injectors to ground or engine chassis. In fuel injection system, with the fuel injectors sharing connections, the short-circuiting of one of the fuel injectors may lead to unintended actuation of associated fuel injectors. This unintended injection may result in unwanted forces and lead to damage to engine's components.

US Patent Application No. 20080212246 discloses systems and methods for detecting a short in an electrical distribution system. A determination is made as to whether a short condition is satisfied based on a change in a voltage in a wire harness coupled to a first side of a switch. The determination of whether a short exists is made in response to determining whether the short condition has been satisfied for at least a threshold time. The threshold time is dependent on a change in a voltage of the wire harness coupled to a second side of the switch.

SUMMARY

In an aspect, the present disclosure provides a method for fault diagnosis in a fuel injection system having first and second fuel injectors. The method includes initiating a current flow in the first and second fuel injectors. Further, a rise duration of the current flow to reach a threshold level is measured. The method further includes comparing the rise duration and a preset duration. The fuel injection system is controlled based on the comparison.

In another aspect, the present disclosure provides a control system for fault diagnosis in the fuel injection system having the first and second fuel injectors. The control system includes a first module configured to initiate current flow in the first and second fuel injectors. The control system includes a second module configured to measure a rise duration of the current flow, from the first and second fuel injectors, to reach a threshold level. The control system further includes a third module configured to compare the rise duration and a preset duration. Further, the control system includes a fourth module configured to control the fuel injection system based at least on the comparison.

Other features and aspects of this disclosure will be apparent from the following description and the accompanying drawings.

DETAILED DESCRIPTION

Figure 1:
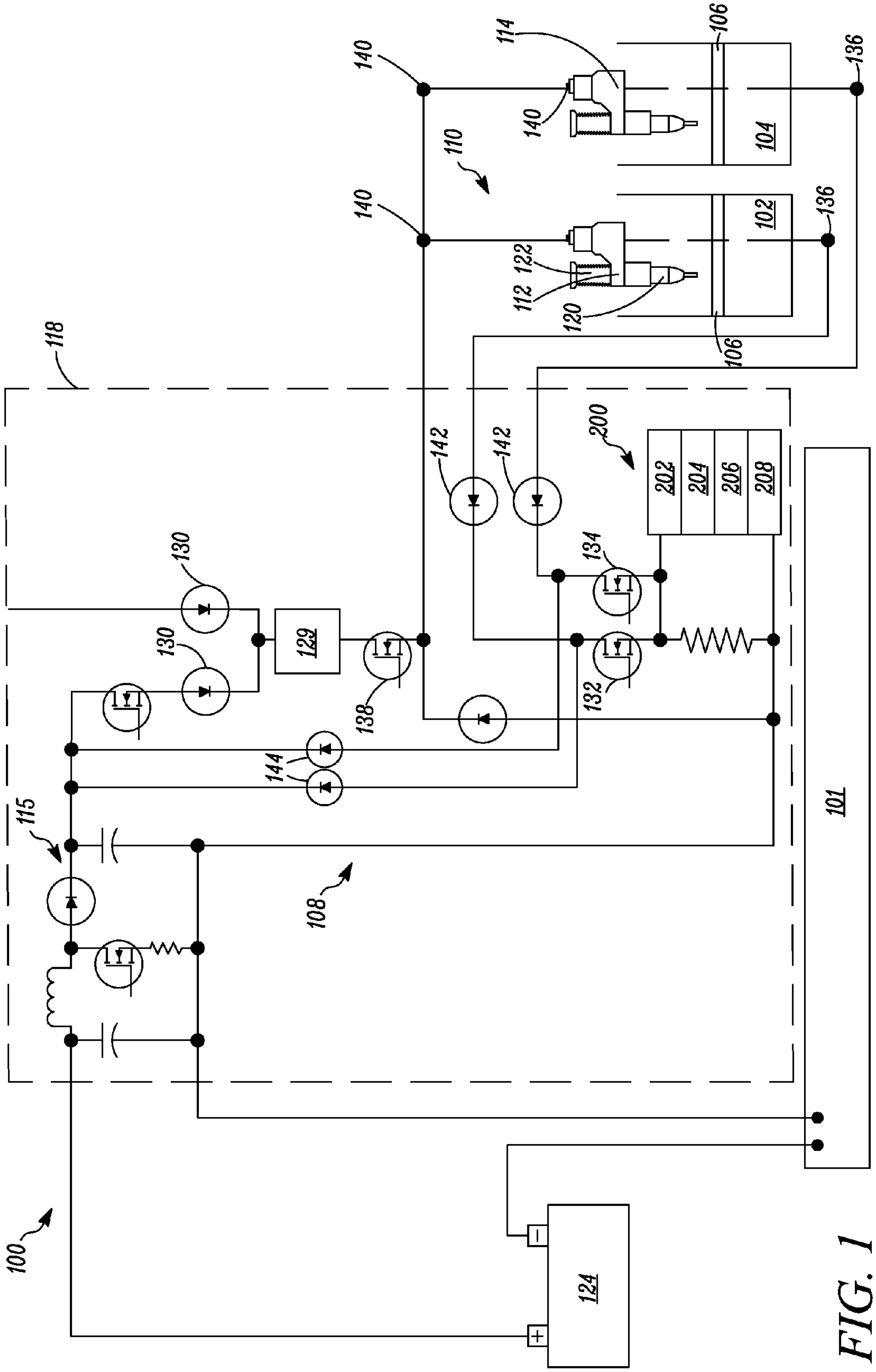
FIG. 1 illustrates a engine system with a fuel injection system, according to an aspect of the present disclosure.
Figure 2:
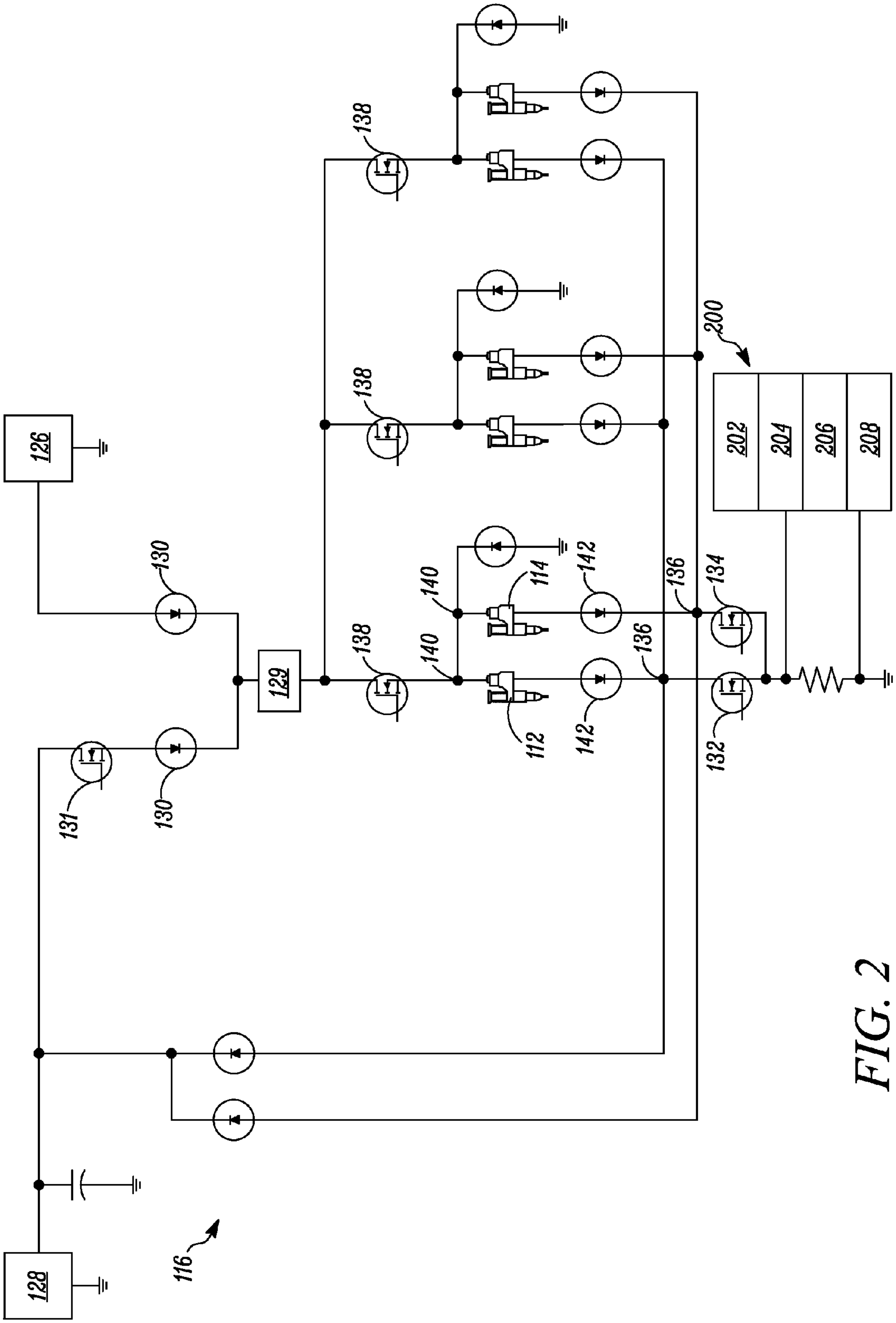
FIG. 2 illustrates a driver circuit in the fuel injection system, according to an aspect of the present disclosure.

The present disclosure will now be described in detail with reference being made to accompanying figures. Referring to FIG. 1, an engine system 100, such as an automotive vehicle or construction machinery engine is generally shown. The engine system 100 may include may include an engine block 101 having a number of cylinders disposed in any one of an inline configuration, a V-configuration, a W-configuration, or an X-configuration, etc. For the purpose of clear illustration, FIG. 1 shows only one cylinder set having a first cylinder 102 and a second cylinder 104. However, the engine block 101 may include a plurality of cylinder sets, each with the first cylinder 102 and the second cylinder 104, as illustrated in FIG. 2. Each of the first and the second cylinders 102, 104 include respective pistons 106, which reciprocates in the corresponding cylinders due to pressure energy generated by combustion of fuel inside the cylinders.

Further, as illustrated in FIG. 1, the engine system 100 includes a fuel injection system 108 which supplies the fuel into the cylinders 102, 104. For example, the fuel injection system 108 may be employed in a diesel engine to inject diesel fuel, or in a spark ignited internal combustion engine to inject combustible gasoline. The fuel injection system 108 include an injector bank 110 having a first fuel injector 112 and a second fuel injector 114, in association with the first cylinder 102 and the second cylinder 104, respectively. The fuel injectors 112, 114 may be electrically actuable to inject the fuel into the cylinders 102, 104. In an embodiment, as illustrated in FIG. 2, the fuel injection system 108 may include a plurality of injector banks 110 associated with each cylinder set. Also, the injector banks 110 may include more than two fuel injectors, depending on the number of cylinders in each cylinder set.

In an embodiment of the present disclosure, the fuel injection system 108 may employ a driver circuit 116 for each of the injector banks 110. The driver circuit 116 may be associated with the injector bank 110, to monitor and control the first and second fuel injectors 112, 114. The driver circuit 116 may form a part of an Engine Control Module (ECM) 118. The ECM 118 may, typically, include a microprocessor and a memory which are arranged to perform various routines to control the operation of the engine system 100. For example, the ECM 118 may be configured to monitor engine speed and load, and provide the feedback to the driver circuit 116 to control the timing of operation and the amount of fuel supplied to the fuel injectors 112, 114. Further, the driver circuit 116 receives signals indicating the reciprocation of the pistons 106 in the first and the second cylinders 102, 104, and accordingly actuates the fuel injectors 112, 114 to supply the fuel.

Typically, each of the fuel injectors 112, 114, in the injector bank 110, includes an injection valve 120 and an actuator 122. The actuator 122 may be any one of a solenoid coil, piezo-electric actuator, or the like. The actuator 122 may be operable by the driver circuit 116 to cause the injector valve 120 to open and close, in order to control the injection of the fuel into the associated cylinders.

FIG. 2 illustrates a detailed embodiment of the driver circuit 116. The driver circuit 116 may include a power source 124. In an embodiment, the power source 124 may be a combination of, for example, but not limited to, a battery 126, and a High Voltage Power Supply (HVPS) 128 working in conjunction, via a current mirror 129 and a pair of diodes 130. Such an arrangement may provide voltage proportional to the load by the fuel injectors 112, 114. The driver circuit 116 may also include a boost circuit 115 which amplifies the power from the power source 124, as shown in FIG. 1. The driver circuit 116 may also include means for noise suppression, such as, a capacitor, or like connected to the power source 124.

The driver circuit 116 includes a first selector switch 132 and a second selector switch 134, disposed in a low-side, that is, between the first fuel injector 112 and the second fuel injector 114, respectively, and the power source 124. The first and second selector switches 132, 134 may be connected to first terminals 136 of the first and second fuel injectors 112, 114, and controllably connect and disconnect the first and second fuel injectors 112, 114 to and from the power source 124. Further, the driver circuit 116 may include a multiplexed switch 138 disposed in a high-side, and connected to second terminals 140 of the first and second fuel injectors 112, 114 to controllably connect and disconnect the first and second fuel injectors 112, 114 to and from the power source 124.

In an embodiment of the present disclosure, the first and second selector switches 132, 134 are field effect transistors (FET's) with a drain connected to the power source 124. Similarly, the multiplexed switch 138 may also be a field effect transistor (FET) with a drain in connection with the power source 124. In an embodiment, the driver circuit 116 of the present disclosure may use n-type MOSFET as switches 132, 134, 138. It will be apparent to a person ordinarily skilled in the art, the fuel injection system 108 of the present disclosure have the injector banks 110 share the low-side. That is, each of the injector banks 110 is connected to the same first and second selector switches 132, 134. Further, the fuel injectors 112, 114 in each of the injector bank 110 share a common multiplexed switch 138 in the high-side.

The driver circuit 116 may include diodes 142 connected between the first terminals 136 of the first and second fuel injectors 112, 114 and the power source 124. The diodes 142 may allow the current flow from the high-side to the low-side via the fuel injectors 112, 114. The driver circuit 116 may also include diodes 144 to ensure unidirectional current flow through the fuel injectors 112, 114.

In an embodiment, the driver circuit 116 of the present disclosure includes a control system 200 for controlling the fuel injection system 108. Generally, the control system 200 may be a combination of, but not limited to, a processor, a Read Only Memory, a Random-Access Memory, a Logic Unit, etc. The control system 200 may primarily control the first and second selector switches 132, 134 and the multiplexed switch 138 in order to control the current flow through the driver circuit 116, and therefore the fuel injectors 112, 114 for injection of the fuel.

The control system 200 may be operable to selectively trigger the first and second fuel injectors 112, 114 at desired points in time, by closing the multiplexed switch 138 while operating the first and second selector switches 132, 134 in alternating on and off states, whereby a first average magnitude of current is supplied to the first fuel injector 112 during a first period of time and a second average magnitude of current is supplied to the second fuel injector 114 during a second period of time subsequent to the first period of time.

According to an embodiment, the control system 200 may further be configured for fault diagnosis in the fuel injection system 108. For example, the control system 200 may help to diagnose the fault condition due to either of the first and second fuel injectors, 112, 114 of the fuel injection system 108 being short-circuited to ground or engine chassis of the engine block 101.

The control system 200 may include a first module 202 to close the multiplexed switch 138 along with the first and second selector switches 132, 134, and thus initiates a current flow in the driver circuit 116. In an embodiment, the first module 202 may close the switches 132, 134, 138 for a pre-selected time in order to cause the current flow for this pre-selected time duration. The first module 202 may also be configured to ensure that the current flow is initiated before the timed actuation of the first and second fuel injectors 112, 114, as determined by ECM 118. Further, the current flow may be limited not to cause the actuation of the actuators 122 in the first and second fuel injectors 112, 114 for fuel injection.

Further, the control system 200 may include a second module 204 to measure rise duration of the current flow, that is, the time for the current flow from the first and second fuel injectors 112, 114 to reach a predetermined threshold level. For example, the threshold level may be equivalent to peak value of voltage of the current waveform passing from the first and second fuel injectors 112, 114. The current level may be measured by using a current-sensing circuit, and further means may be provided to indicate when the threshold level is reached. Also, the rise duration may be measured by any known process in the art, such as, but not limited to, using a counting circuit or the like.

The control system 200 may further include a third module 206 to compare the measured rise duration with a preset duration. The preset duration of the current flow may be defined during normal operation of the fuel injection system 108, that is, when neither of the first and second fuel injectors 112, 114 are short-circuited to the ground or the engine chassis. For this purpose, the third module 206 may include an arithmetic logic unit (ALU), such as, an adder circuit, etc. The third module 206 may further generate a fault signal based on the comparison. Specifically, the third module 206 may be configured to generate the fault signal when the rise duration is greater than the preset duration. Here, the fault signal may be indicative of a short-circuited fuel injector out of the first and second fuel injectors 112, 114. This is because, if any of the first and second fuel injectors 112, 114 is short-circuited, the current waveform may take longer to reach the threshold level, resulting in the rise duration to be greater than the preset duration. In a further embodiment, the third module 206 may be configured to generate the fault signal when the rise duration is greater than the preset duration by more than a tolerance limit. The tolerance limit may be set over the threshold level, so as to avoid unwanted fault signals for each current cycle with the rise duration above the threshold level.

Further, the control system 200 may include a fourth module 208 to control the fuel injection system 108. The fourth module 208 may control the fuel injection system 108 based on the comparison performed by the third module 206. In particular, the fourth module 208 may be configured to disable the fuel injection system 108, in response to the fault signal. The fourth module 208 may achieve this by opening the first and second selector switches 132, 134 and/or the multiplexed switch 138, associated with the first and second fuel injectors 112, 114 of the fuel injection system 108.

In an embodiment, the first module 202 may be configured to initiate a current flow from the first and second fuel injectors 112, 114 for a preselected target current level, that is, the threshold level. Further, the second module 204 may be configured to switch open the second selector switch 134, when the combined current flow reaches the threshold level. The third module 206 may indicate whether the combined current level reaches the threshold level in the allowable duration or not. If the combined current level did not reach the threshold level in the allowable duration, the third module 206 may generate a fault signal.

For this purpose, the driver circuit 116 may employ a counter which generates the fault signal if the count exceeds a predetermined count for the current level to reach the threshold level. Further, the fourth module 208 may be configured to control the fuel injection system 108 based on the indication and/or the fault signal. In an exemplary configuration, the fourth module 208 may be configured to shut-off the fuel injection system 108 in case of the fault signal.

In an exemplary configuration, the rise duration for the combined current level to reach the threshold level may be very high when neither of the first and second fuel injectors 112, 114 are shorted. There may a worst case scenario that the current level never reaches the threshold level, including but not limited to the high inductance of the first and second fuel injectors 112, 114. In such cases, the control system 200 may incorporate tolerances for slow current rise duration, and generate the fault signal.

INDUSTRIAL APPLICABILITY

The industrial applicability of the system described herein will be readily appreciated from the foregoing discussion. The fuel injection system 108 of the present disclosure may be employed in any machine, such as, but not limited to, an automobile, an earth-moving machine like a loader, an excavator, a tractor, etc. Typically, such machines include electrical distribution system with wire harnesses, which in turn may include multiple wires for establishing electrical connections between devices in the machine. For example, the electrical distribution system may connect the power source to devices such as the starter, lights, and radio. For example, the electrical distribution system may also be utilized for connecting the fuel injectors 112, 114 of the fuel injection system 108 to the power source 124.

During operation, one or more wires of the wire harness in the electrical distribution system may be subject to a short. A short generally results from a significant drop in the impedance of a device connected to the electrical distribution system. This may result in continuous current flow through the short-circuited device, and may affect the operation of the electrical distribution system. Failure to detect a short may potentially damage the electrical distribution system and/or devices connected to such electrical distribution system.

For example, the wires connected to the first terminals 136 or the second terminals 140 of the fuel injectors 112, 114 may be short-circuited to ground or the engine chassis. The ECM 118 may command the injection of the fuel in the first cylinder 102. Accordingly, the driver circuit 116 may close the multiplexed switch 138, and subsequently the first selector switch 132 to create a path for current flow through the first fuel injector 112. But with the short-circuited second fuel injector 114, the current will also flow through the second fuel injector 114 and cause unintended injection of the fuel in the second cylinder 104.

Further, the driver circuit 116 may not be able to drive down the current because of the short-circuited fuel injector, that is, the current decay is slowed. So, the current flow through the short-circuited fuel injector will be for excessively long duration, and therefore lead to large quantity of unintended fuel injection in the associated cylinder. The mistimed combustion of such large quantity of fuel may result in forces which may damage some components of the engine such as connecting rod, piston, crankshaft, etc.

There have, in the past, been some efforts made towards protecting the engine due to possible damages due to mistimed injection because of the short-circuiting of the fuel injectors. Such methods have taken various forms, including mechanical and electrical arrangements that may be complex and expensive. These methods mostly involve measuring voltage at the selector switch in a period immediately following end of the current, or by detecting current through the fuel injectors above the highest allowable limit. Therefore, such methods detect the faults too late to prevent the engine damage.

Figure 3:
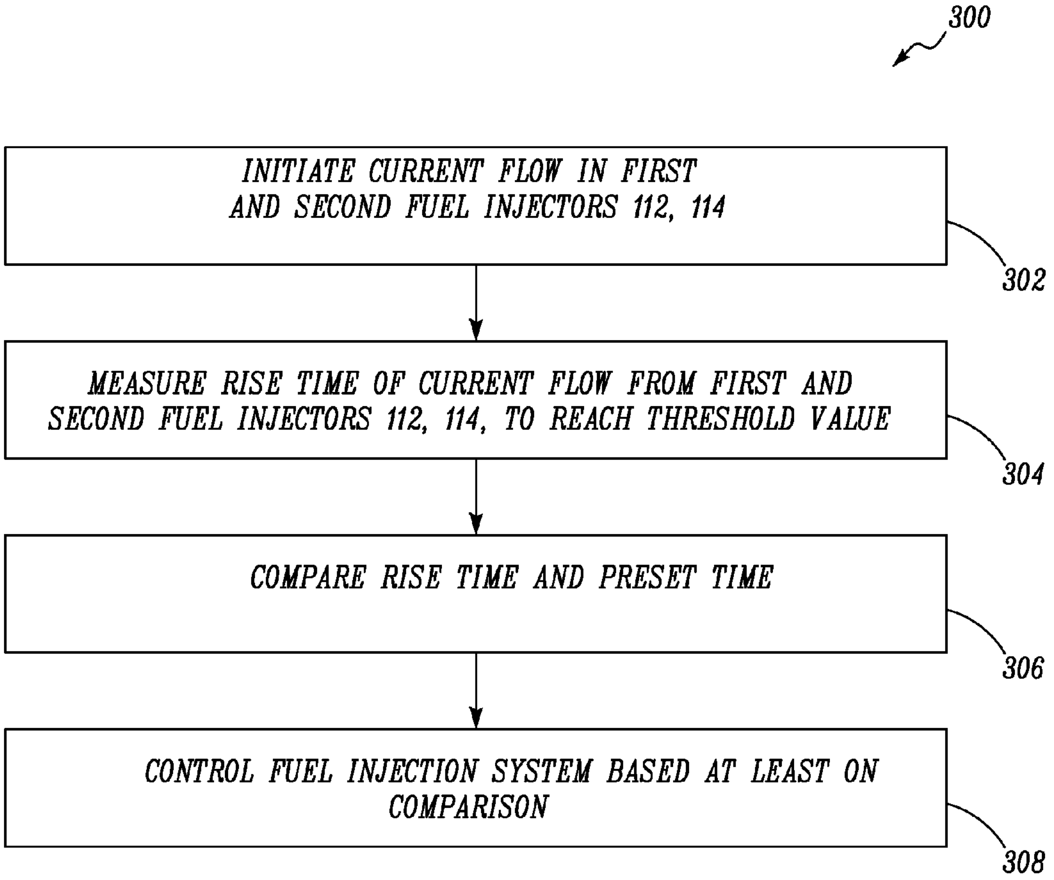
FIG. 3 illustrates a process flow for fault diagnosis in the fuel injection system, according to an aspect of the present disclosure.

The present disclosure provides a method of diagnosing such fault conditions at the beginning of the fuel injection event, and thereby eliminate chances of unintended fuel injection by shutting-off the fuel injection system 108 in case of any fault. This method has been described by means of a process flow 300, as illustrated in FIG. 3.

In step 302, the process flow involves initiating a current flow in the first and second fuel injectors 112, 114. The current flow may be initiated in the first and second fuel injectors for a preselected time. Further, in step 304, rise duration for the current flow, from the first and second fuel injectors 112, 114, is measured to reach a threshold level. Subsequently, in step 306, the measured rise duration is compared with a preset duration. Based on the comparison, a fault signal is generated when the rise duration is greater than the preset duration, the fault signal being indicative of a short-circuited fuel injector. Finally, in step 308, the fuel injection system 108 may be controlled based at least on the comparison. Specifically, the first and second fuel injectors 112, 114 may be disabled in response to the fault signal.

The method, described in process flow 300, may be achieved by means of the control system 200 of the present disclosure. The control system 200 may be configured for fault diagnosis in the fuel injection system 108. In an exemplary embodiment, the control system 200 may close the switches 132, 134 and 138, and pass a combined current through the fuel injectors 112, 114 of about 1 A (or 0.5 A nominal for each fuel injector), with a rise duration of approximately 10 micro-seconds to reach the threshold level, in case of no fuel injector being short-circuited. The preset duration for the current waveform to reach the threshold level is set at around 14 micro-seconds. The control system 200 measures the rise duration for the current waveform, and generate the fault signal when the rise duration is greater than 14 micro-seconds. The control system 200, then, disables the fuel injectors 112, 114 and prevents further fuel injection and possible damage to the engine.

In an alternative method, the current flow through the first and second fuel injectors 112, 114 may be initiated for a preselected threshold level. If the current flow did not reach the threshold level with in the preset duration, the fault signal is generated indicative of the short-circuited fuel injector. In this example configuration, the control system 200 allows 14 micro-seconds for the combined current to reach the threshold value of 1 A to be sensed. If subsequent to 14 micro-seconds, the combined current level is not equal or greater than 1 A, further fuel injection is disabled.

The method of the present disclosure may be implemented by configuring the existing Field-programmable gate array (FPGA) to carry out the task of the control system 200. Further, the specific rise duration ranges may be determined for differentiating between the normal operating condition and the short-circuited condition for all operating conditions of the fuel injectors in the fuel injection system 108. In an embodiment, the control system 200 may be programmed to stop further fuel injection after determination of the fault condition, but continue attempts to check for the fault condition, and permanently shut-off the fuel injection system 108 and ultimately the engine system 100 after repeated encountering of the fault condition.

Although the embodiments of this disclosure as described herein may be incorporated without departing from the scope of the following claims, it will be apparent to a person skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A method for fault diagnosis in a fuel injection system having first and second fuel injectors, the method comprising:

initiating a current flow in the first and second fuel injectors;

measuring a rise duration of the current flow from the first and second fuel injectors, to reach a threshold level;

comparing the rise duration and a preset duration; and controlling the fuel injection system based at least on the comparison.

2. The method of claim 1, wherein the current flow is initiated in the first and second fuel injectors, for a preselected time.

3. The method of claim 1 further includes generating a fault signal indicative of a short-circuited fuel injector from the first and second fuel injectors, based on the comparison.

4. The method of claim 3, wherein the fault signal is generated when the rise duration is greater than the preset duration.

5. The method of claim 3, wherein the fault signal is generated when the rise duration is greater than the preset duration by more than a tolerance limit.

6. The method of claim 1, wherein controlling the fuel injection system includes opening the first and second fuel injectors, in response to the fault signal.

7. A control system for fault diagnosis in a fuel injection system having first and second fuel injectors, the control system comprising:

a first module configured to initiate current flow in the first and second fuel injectors;

a second module configured to measure a rise duration of the current flow, from the first and second fuel injectors, to reach a threshold level;

a third module configured to compare the rise duration and a preset duration; and a fourth module configured to control the fuel injection system based at least on the comparison.

8. The control system of claim 7, wherein the first module initiates current flow in the first and second fuel injectors for a preselected time.

9. The control system of claim 7, wherein the first module is configured to close first and second selector switches associated with first and second fuel injectors, respectively, to initiate the current flow.

10. The control system of claim 7, wherein the third module is configured to generate a fault signal when the rise duration is greater than the preset duration, the fault signal being indicative of a short-circuited fuel injector from the first and second fuel injectors.

11. The control system of claim 10, wherein the fourth module is configured to open the first and second selector switches associated with the first and second fuel injectors, respectively, in response to the fault signal.

12. A driver circuit configured to operate first and second fuel injectors of a fuel injection system, the driver circuit comprising:

a power source;

first and second selector switches associated with first terminals of the first and second fuel injectors, respectively, and for controllably connecting and disconnecting the first and second fuel injectors to and from the power source; and a control system including:

a first module configured to close the first and second selector switches, associated with the first and second fuel injectors respectively, to initiate current flow in the first and second fuel injectors, a second module configured to measure a rise duration of the current flow from the first and second fuel injectors, to reach a threshold level, a third module configured to compare the rise duration and a preset duration, and a fourth module configured to control the fuel injection system based at least on the comparison.

13. The driver circuit of claim 12, wherein the first module initiates current flow in the first and second fuel injectors for a preselected time.

14. The driver circuit of claim 12, wherein the third module is configured to generate a fault signal when the rise duration is greater than the preset duration, the fault signal being indicative of a short-circuited fuel injector from the first and second fuel injectors.

15. The driver circuit of claim 14 further including a multiplexed switch associated with second terminals of the first and second fuel injectors, and for controllably connecting and disconnecting the first and second fuel injectors, respectively, to and from the power source.

16. The driver circuit of claim 15, wherein the fourth module is configured to open the first and second selector switches and/or the multiplexed switch, in response to the fault signal.

17. A fuel injection system, comprising:

first and second fuel injectors electrically-actuable to inject fuel into associated cylinders of an engine system, wherein a piston reciprocates in the cylinder;

a power source;

first and second selector switches associated with first terminals of the first and second fuel injectors, respectively, and for controllably connecting and disconnecting the first and second fuel injectors to and from the power source;

a multiplexed switch associated with second terminals of the first and second fuel injectors, and for controllably connecting and disconnecting the first and second fuel injectors to and from the power source; and a control system operable for fault diagnosis in the fuel injection system, the control system including:

a first module configured to close the modulation switch and the first and second selector switches, associated with first and second fuel injectors respectively, to initiate current flow in the first and second fuel injectors, a second module configured to measure a rise duration of the current flow from the first and second fuel injectors to reach a threshold level, a third module configured to compare the rise duration and a preset duration, and generate a fault signal when the rise duration is greater than the preset duration, and a fourth module configured to open the first and second fuel injectors based at least on the fault signal.

18. The fuel injection system of claim 17, wherein the control system is operable to selectively actuate the first and second fuel injectors at desired points in time in synchronism with the reciprocation of the pistons in the cylinders, by closing the modulation switch while operating the first and second selector switches in alternating on and off states, whereby a first average magnitude of current is supplied to the first fuel injector during a first period of time and a second average magnitude of current is supplied to the second fuel injector during a second period of time subsequent to the first period of time so that a particular quantity of fuel is injected into each cylinder.

19. The fuel injection system of claim 17, wherein the first module is configured to close the modulation switch and the first and second selector switches before a first period of time.

20. The fuel injection system of claim 17, wherein the first module initiates current flow in the first and second fuel injectors for a preselected time.

* * * * *